United States Patent
Moustakakis et al.

(10) Patent No.: US 11,092,036 B2
(45) Date of Patent: Aug. 17, 2021

(54) GAS DAMPER AND BEARING IN A PROPULSION SYSTEM

(71) Applicant: United Technologies Corporation, Farmington, CT (US)

(72) Inventors: Michael P. Moustakakis, New Britain, CT (US); Daniel R. Bowers, Hebron, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/744,619

(22) Filed: Jan. 16, 2020

(65) Prior Publication Data

US 2021/0222584 A1 Jul. 22, 2021

(51) Int. Cl.
*F01D 25/04* (2006.01)

(52) U.S. Cl.
CPC ........ *F01D 25/04* (2013.01); *F05D 2220/323* (2013.01); *F05D 2260/20* (2013.01); *F05D 2260/96* (2013.01)

(58) Field of Classification Search
CPC ............... Y02T 10/144; F05D 2220/40; F05D 2220/323; F05D 2260/20; F05D 2260/96; F01D 25/04; B60Y 2400/435
See application file for complete search history.

(56) References Cited

U.S. PATENT DOCUMENTS

| | | | |
|---|---|---|---|
| 4,756,053 A | 7/1988 | Madden et al. | |
| 7,997,057 B1 | 8/2011 | Harris et al. | |
| 8,070,435 B1 | 12/2011 | Eng | |
| 9,746,029 B1 | 8/2017 | Mook et al. | |
| 9,784,126 B2 | 10/2017 | Army et al. | |
| 10,487,688 B2* | 11/2019 | Venter | F01D 15/12 |
| 10,577,975 B2* | 3/2020 | Ertas | F16C 27/02 |
| 10,801,350 B2* | 10/2020 | Walston | F01D 11/08 |
| 10,816,035 B2* | 10/2020 | Ertas | F01D 25/06 |
| 2010/0278465 A1 | 11/2010 | Klusman et al. | |
| 2017/0175572 A1* | 6/2017 | Vetters | F01D 25/12 |
| 2018/0003080 A1* | 1/2018 | Becker | F01D 9/023 |
| 2021/0003034 A1* | 1/2021 | Ertas | F02C 7/06 |

OTHER PUBLICATIONS

EP Application No. 21151932.7 Extended EP Search Report dated May 26, 2021, 8 pages.

* cited by examiner

*Primary Examiner* — Jesse S Bogue
(74) *Attorney, Agent, or Firm* — Cantor Colburn LLP

(57) ABSTRACT

A component assembly of a propulsion system includes a component housing having a plenum configured to receive a pressurized gas flow of the propulsion system. The component assembly also includes a lug integrally formed with the component housing, a lug base region including a vent hole forming a gas path between the plenum and an interior of the lug, and a pin. The pin is configured to be positioned within the interior of the lug, where a cavity is formed between an interior surface of the lug and an exterior surface of the pin as positioned within the lug, thereby forming a compressed gas layer to reduce vibration of the pin within the cavity based on the pressurized gas flow passing from the plenum through the vent hole into the cavity.

20 Claims, 6 Drawing Sheets

GAS DAMPER AND BEARING IN A PROPULSION SYSTEM

BACKGROUND

The subject matter disclosed herein generally relates to propulsion systems and, more particularly, to a method and an apparatus for providing a gas damper and bearing in a propulsion system.

A propulsion system for an aircraft can include one or more gas turbine engines that combust fuel and provide propulsive power. Gas turbine engines include mechanical components that may be linked at joints by hinge pins. Components within a gas turbine engine may be subjected to extreme temperature variations depending on operating environment and relative position upstream or downstream from the combustor section. Mechanical joints may include gap space to account for thermal growth and other considerations, e.g., manufacturing tolerances. Excessive gaps in mechanical joints can result in excessive wear. For example, larger gaps between components that are subject to relative motion can experience vibratory loads that result in fretting wear. Wear can also occur in joints where direct contact occurs between components. Further, direct contact between components can require higher actuation forces at the joints. A mechanical bushing or bearing may be used in some locations to alleviate rotational issues at joints; however, mechanical bushings and bearings add weight and complexity to mechanical systems.

BRIEF DESCRIPTION

According to one embodiment, a component assembly of a propulsion system includes a component housing having a plenum configured to receive a pressurized gas flow of the propulsion system. The component assembly also includes a lug integrally formed with the component housing, a lug base region including a vent hole forming a gas path between the plenum and an interior of the lug, and a pin. The pin is configured to be positioned within the interior of the lug, where a cavity is formed between an interior surface of the lug and an exterior surface of the pin as positioned within the lug, thereby forming a compressed gas layer to reduce vibration of the pin within the cavity based on the pressurized gas flow passing from the plenum through the vent hole into the cavity.

In addition to one or more of the features described above or below, or as an alternative, further embodiments may include a journal cutout within the interior of the lug and proximate to the vent hole, where the journal cutout is configured to reduce premature expulsion of the pressurized gas flow to an environment external to the component assembly.

In addition to one or more of the features described above or below, or as an alternative, further embodiments may include where the pin is a hinge pin of a secondary component of the propulsion system, and the secondary component is configured to rotate relative to the component housing.

In addition to one or more of the features described above or below, or as an alternative, further embodiments may include where damping of a plurality of vibratory loads is provided as the pin compresses the pressurized gas flow between the vent hole and an environment external to the component assembly, thereby reducing fretting wear of the component assembly.

In addition to one or more of the features described above or below, or as an alternative, further embodiments may include a second lug integrally formed with the component housing and a second lug base region including a second vent hole forming a second gas path between the plenum and an interior of the second lug, where the pressurized gas flow is split from the plenum between the vent hole and the second vent hole.

In addition to one or more of the features described above or below, or as an alternative, further embodiments may include where the pin is configured to be positioned within the lug and the second lug during operation of the propulsion system.

In addition to one or more of the features described above or below, or as an alternative, further embodiments may include where the pressurized gas flow is a cooling flow configured to provide cooling to an interior of the component housing.

According to an embodiment, a gas turbine engine of a propulsion system includes a fan section, a compressor section, a combustor section, a turbine section, and a nozzle. The gas turbine engine also includes a component assembly of the fan section, the compressor section, the combustor section, the turbine section, or the nozzle. The component assembly includes a component housing having a plenum configured to receive a pressurized gas flow of the gas turbine engine, a lug integrally formed with the component housing, a lug base region comprising a vent hole forming a gas path between the plenum and an interior of the lug, and a pin. The pin is configured to be positioned within the interior of the lug, where a cavity is formed between an interior surface of the lug and an exterior surface of the pin as positioned within the lug, thereby forming a compressed gas layer to reduce vibration of the pin within the cavity based on the pressurized gas flow passing from the plenum through the vent hole into the cavity.

In addition to one or more of the features described above or below, or as an alternative, further embodiments may include where the pin is a hinge pin of a secondary component of the gas turbine engine, and the secondary component is configured to rotate relative to the component housing.

In addition to one or more of the features described above or below, or as an alternative, further embodiments may include where the pin is configured to be positioned within the lug and the second lug during operation of the gas turbine engine.

According to an embodiment, a method includes providing a pressurized gas flow in a plenum of a component assembly of a propulsion system and directing the pressurized gas flow from the plenum through a vent hole to a lug of the component assembly. The pressurized gas flow circulates in a cavity between an interior surface of the lug and an exterior surface of a pin positioned within the lug, thereby forming a compressed gas layer to reduce vibration of the pin within the cavity. The pressurized gas flow is released from the cavity to an environment external to the component assembly.

In addition to one or more of the features described above or below, or as an alternative, further embodiments may include damping a plurality of vibratory loads as the pin compresses the pressurized gas flow between the vent hole and the environment external to the component assembly, thereby reducing fretting wear of the component assembly.

In addition to one or more of the features described above or below, or as an alternative, further embodiments may include splitting the pressurized gas flow from the plenum between the vent hole and a second vent hole that forms a second gas path between the plenum and an interior of a second lug.

A technical effect of the apparatus, systems and methods is achieved by providing gas damper and/or bearing in a propulsion system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
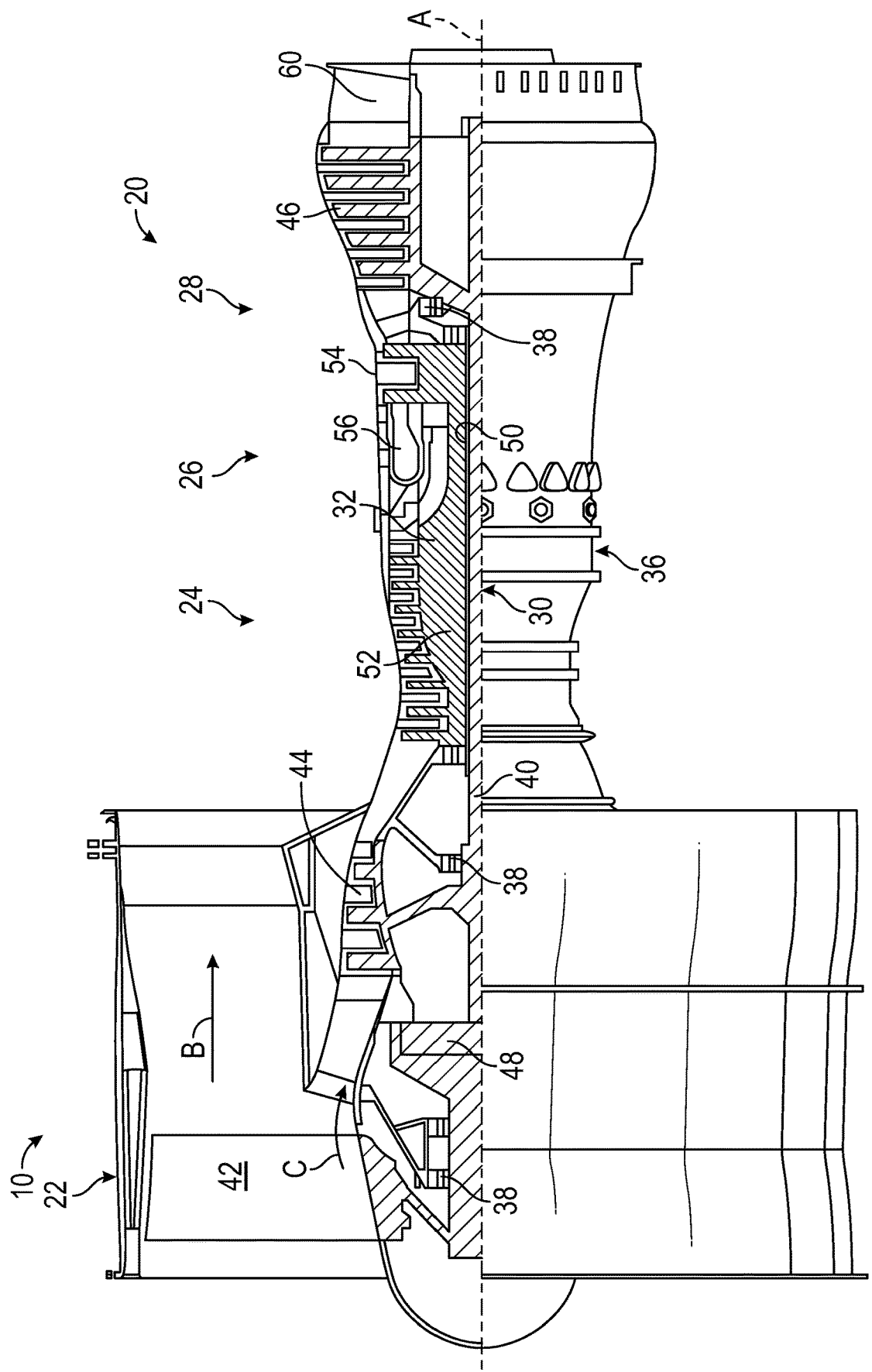
FIG. 1 is a partial cross-sectional illustration of a gas turbine engine, in accordance with an embodiment of the disclosure.

FIG. 1 schematically illustrates a gas turbine engine 20 as part of a propulsion system 10 that can include multiple instances of the gas turbine engine 20 and other components (not depicted). The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle 60. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, systems described herein can be used in a variety of applications and need not be limited to gas turbine engines for aircraft applications. For example, systems described herein can be included in power generation systems, which may be ground-based as a fixed position or mobile system, and other such applications.

Figure 3:
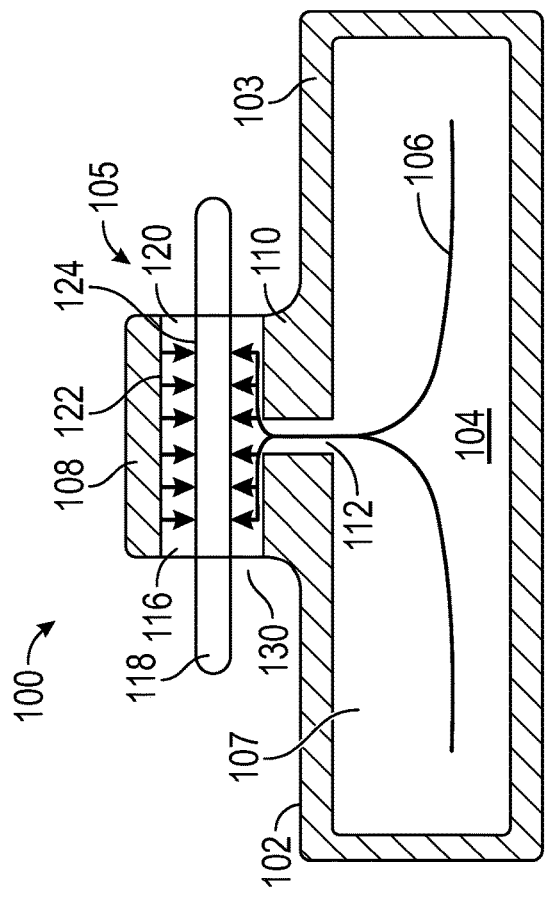
FIG. 3 is a sectional view of a portion of the component assembly of FIG. 2, in accordance with an embodiment of the disclosure.
Figure 4:
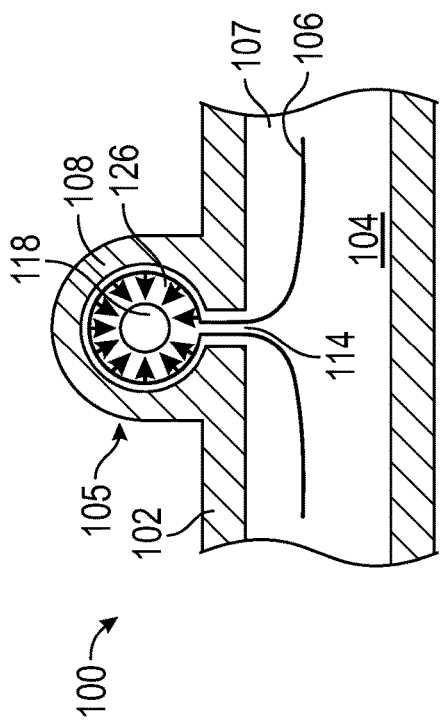
FIG. 4 is a sectional view of a portion of the component assembly of FIG. 2, in accordance with an embodiment of the disclosure.
Figure 2:
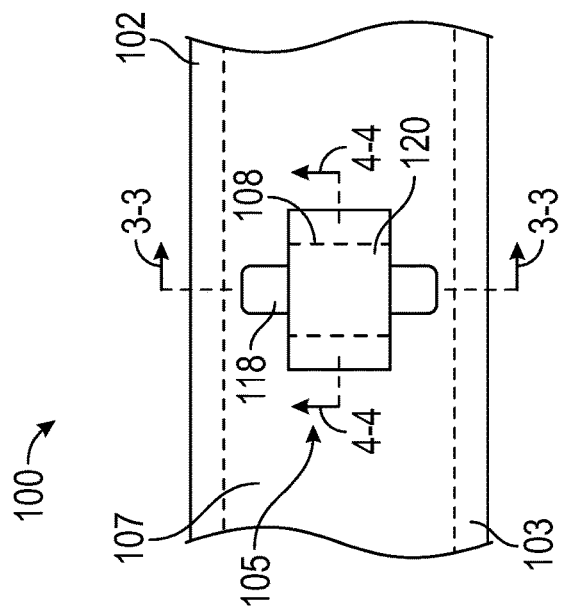
FIG. 2 is a schematic diagram of a component assembly, in accordance with an embodiment of the disclosure.
Figure 5:
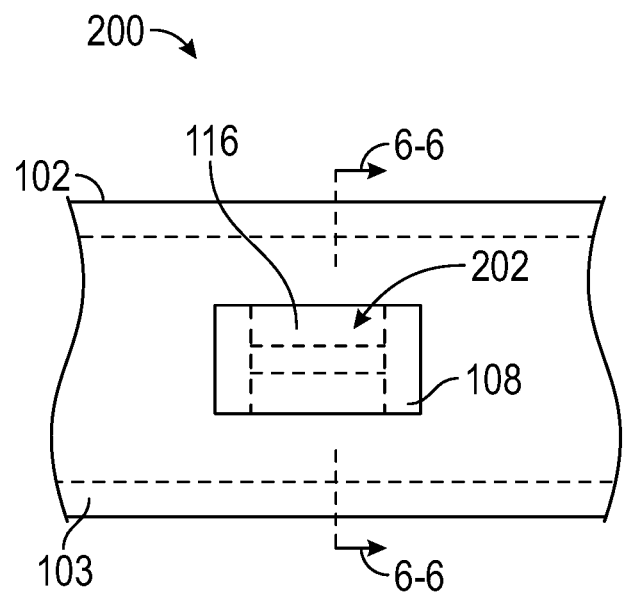
FIG. 5 is a schematic diagram of a component assembly, in accordance with an embodiment of the disclosure.
Figure 6:
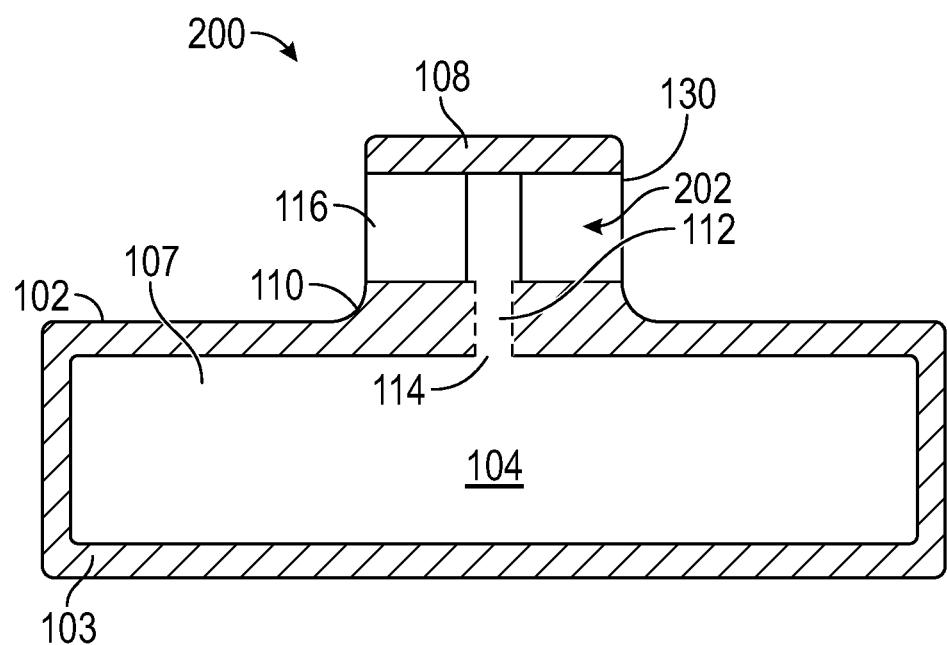
FIG. 6 is a sectional view of a portion of the component assembly of FIG. 5, in accordance with an embodiment of the disclosure.
Figure 7:
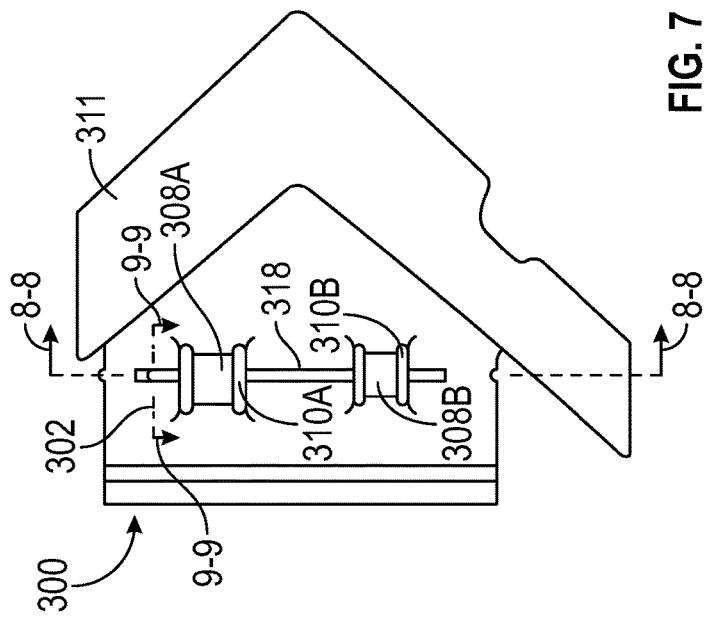
FIG. 7 is a schematic diagram of a component assembly, in accordance with an embodiment of the disclosure.
Figure 8:
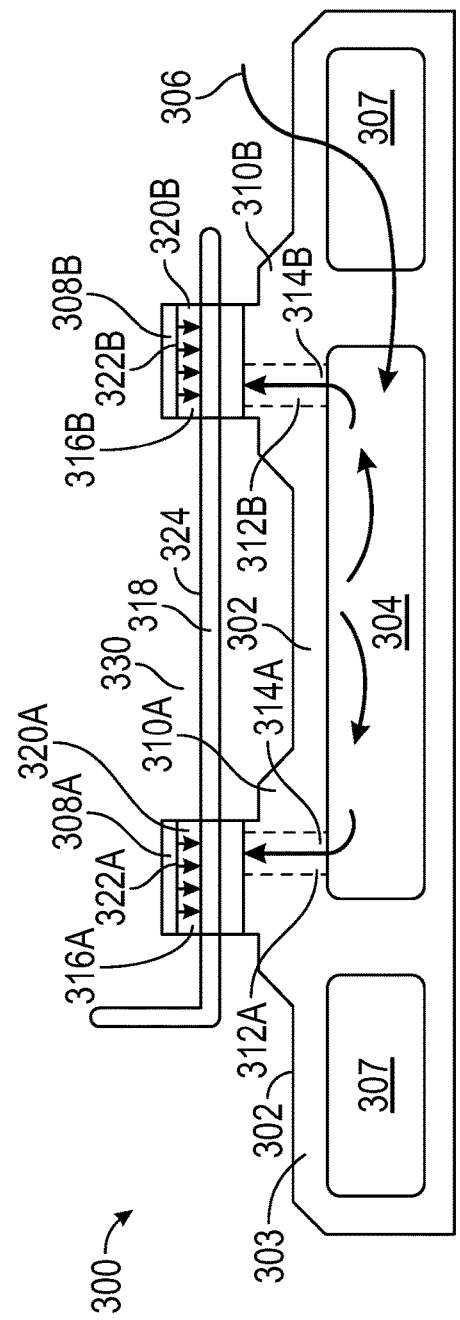
FIG. 8 is a sectional view of a portion of the component assembly of FIG. 7, in accordance with an embodiment of the disclosure.
Figure 9:
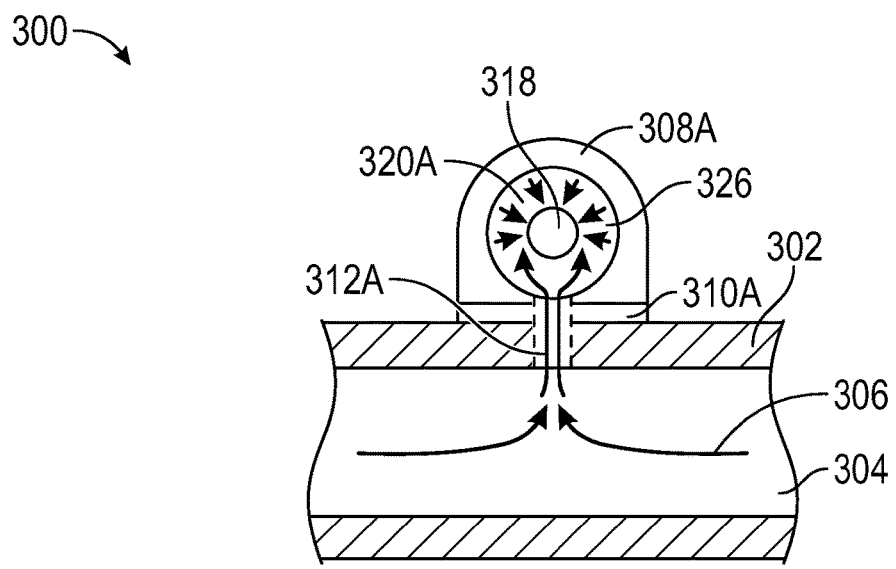
FIG. 9 is a sectional view of a portion of the component assembly of FIG. 7, in accordance with an embodiment of the disclosure.

FIG. 2 illustrates an example of a component assembly 100 that can be part of the propulsion system 10 of FIG. 1. FIGS. 3 and 4 depict cross-sectional views of portions of the component assembly 100. FIG. 5 illustrates another example of a component assembly 200 and is a modified version of the component assembly 100, which also includes a journal cutout 202. FIG. 6 illustrates a cross-sectional view of a portion of component assembly 200. FIG. 7 depicts an example of a component assembly 300 that can be part of the propulsion system 10 of FIG. 1. For example, the component assembly 300 can be located proximate to the turbine section 28 or nozzle 60 of the gas turbine engine 20, where component cooling may be beneficial to component life and performance. FIGS. 8 and 9 depict cross-sectional views of portions of the component assembly 300.

Embodiments of the component assembly 100, 200, 300 can use energy available in a pressurized gas flow, such as a cooling flow or bypass flow path B of FIG. 1 and redirect the pressurized gas flow to a mechanical interface, such as at a joint interface of a lug and pin. The pressurized gas flow can be used to provide loading and damping to reduce vibrations between the pin and lug. Further, the pressurized gas flow can provide a cushion of air to separate components when relative motion occurs through actuation of a joint interface. This can provide enhanced wear protection and reduced complexity, particularly where the pressurized gas flow is already available proximate to or within a component assembly. Where the damping capability is sufficiently high, the joint interface can act as a gas bearing by supporting low friction rotation of mechanical components without the added weight and physical contact of a typical bearing or bushing.

In the example of FIGS. 2-4, the component assembly 100 includes a component housing 102 with a plenum 104 configured to receive a pressurized gas flow 106 of the propulsion system 10 of FIG. 1. For example, pressurized gas flow 106 can be a cooling flow used to cool the interior of the component housing 102. Rather than venting the cooling flow of the pressurized gas flow 106 through cooling holes distributed throughout the component housing 102 directed venting can be used to vent the pressurized gas flow 106 to a joint interface 105 where gas damping is performed. In some embodiments, the component housing 102 may still include cooling holes in one or more walls 103, although the cooling transfer area may be reduced as compared to components that do not include venting to a joint interface. The plenum 104 can be formed as an interior cavity 107 between walls 103 of the component housing 102.

The component assembly 100 also includes a lug 108 integrally formed with the component housing 102 and a lug base region 110 with a vent hole 112 forming a gas path 114 between the plenum 104 and an interior 116 of the lug 108. The component assembly 100 can also include a pin 118 configured to be positioned within the interior 116 of the lug 108. A cavity 120 is formed between an interior surface 122 of the lug 108 and an exterior surface 124 of the pin 118 as positioned within the lug 108, thereby forming a compressed gas layer 126 to reduce vibration of the pin 118 within the cavity 120 based on the pressurized gas flow 106 passing from the plenum 104 through the vent hole 112 into the cavity 120. The pressurized gas flow 106 is then released from the cavity 120 to an environment 130 external to the component assembly 100.

The component assembly 200 of FIGS. 5 and 6 is depicted absent the pin 118 of FIGS. 2-4. The component assembly 200 includes the features of component assembly 100 of FIGS. 2-4, such as lug 108 integrally formed with the component housing 102 and a lug base region 110 with a vent hole 112 forming a gas path 114 between the plenum 104 and an interior 116 of the lug 108. Plenum 104 is be formed as an interior cavity 107 between walls 103 of the component housing 102. As an addition to the component assembly 100 of FIGS. 2-4, the component assembly 200 includes a journal cutout 202 within the interior 116 of the lug 108 and proximate to the vent hole 112, where the journal cutout 202 is configured to reduce premature expulsion of the pressurized gas flow 106 of FIGS. 4 and 5 to an environment 130 external to the component assembly 200. The journal cutout 202 can be a section of the interior 116 of the lug 108 have a larger internal diameter than other portions of the interior 116 that are located further from the vent hole 112. The increase diameter can make a larger pocket of compressed air that results in slowing the rate of venting the interior 116 of the lug 108 when pin 118 of FIGS. 2-4 is positioned within the interior 116 of the lug 108. In the example of FIG. 6, the journal cutout 202 directly aligns with the vent hole 112 such that gas path 114 directly feeds the journal cutout 202 from the plenum 104.

Figure 10:
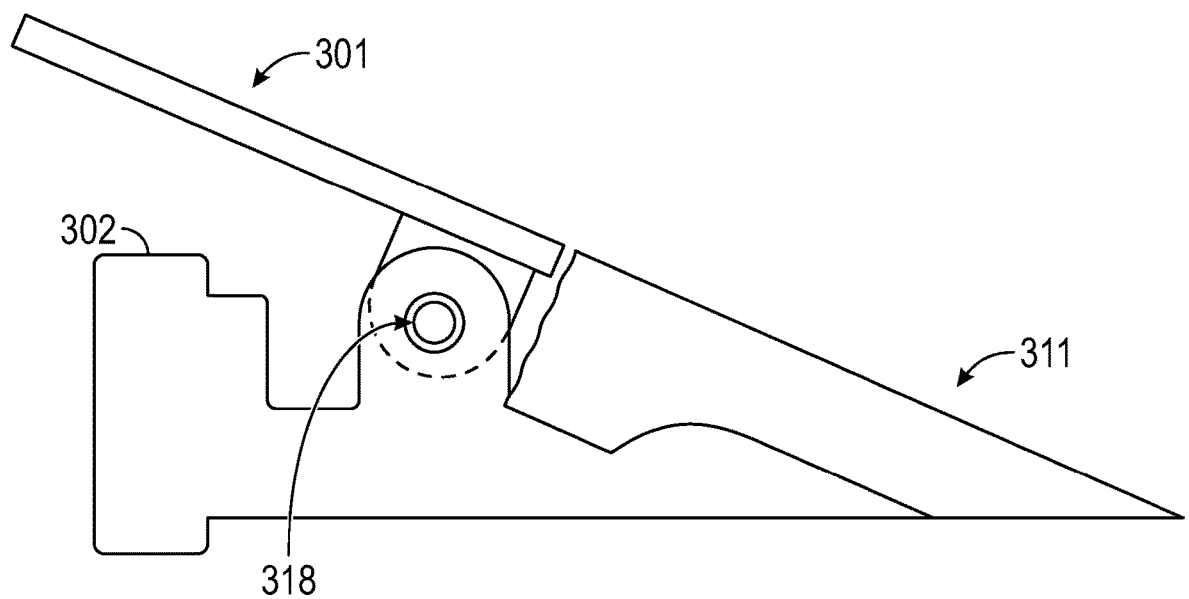
FIG. 10 is a side view of a portion of the component assembly of FIG. 7, in accordance with an embodiment of the disclosure.

The example of component assembly 300 of FIGS. 7-10 includes a first flap 301 configured to rotate relative to a second flap 311, where the first flap 301 and second flap 311 are separate components, as best seen in FIG. 10. For purposes of explanation, the component assembly 300 is depicted without the first flap 301 in FIGS. 7-9. The flaps 301, 311 may be downstream of the combustor section 26 of FIG. 1, for example, where additional cooling flows may be more beneficial to component life and performance due to the higher heat environment as compared to upstream of the combustor section 26. In the example of FIGS. 7-10, the component assembly 300 includes a component housing 302 with a plenum 304 configured to receive a pressurized gas flow 306 of the propulsion system 10 of FIG. 1. For example, pressurized gas flow 306 can be a cooling flow used to cool the interior of the component housing 302. Rather than venting the cooling flow of the pressurized gas flow 306 through cooling holes distributed throughout the component housing 302 directed venting can be used to vent the pressurized gas flow 306 to multiple joint interfaces 305A, 305B where gas damping is performed. In some embodiments, the component housing 302 may still include cooling holes in one or more walls 303, although the cooling transfer area may be reduced as compared to components that do not include venting to a joint interface. The plenum 304 can be formed as an interior cavity 307 between walls 303 of the component housing 302.

The component assembly 300 includes a first lug 308A integrally formed with the component housing 302 and a first lug base region 310A with a first vent hole 312A forming a first gas path 314A between the plenum 304 and an interior 316A of the first lug 308A. The component assembly 300 also includes a second lug 308B integrally formed with the component housing 302 and a second lug base region 310B with a second vent hole 312B forming a second gas path 314B between the plenum 304 and an interior 316B of the second lug 308B. The component assembly 300 can also include a pin 318 configured to be positioned within the interior 316A of the first lug 308A and the interior 316B of the first lug 308B. The pin 318 can be configured to be positioned within the first lug 308A and the second lug 308B during operation of the propulsion system 10 of FIG. 1. A first cavity 320A is formed between an interior surface 322A of the first lug 308A and an exterior surface 324 of the pin 318 as positioned within the first lug 308A, thereby forming a compressed gas layer 326 to reduce vibration of the pin 318 within the first cavity 320A based on the pressurized gas flow 306 passing from the plenum 304 through the first vent hole 312A into the first cavity 320A. Similarly, second cavity 320B is formed between an interior surface 322B of the second lug 308B and the exterior surface 324 of the pin 318 as positioned within the second lug 308B, thereby forming compressed gas layer 326 to reduce vibration of the pin 318 within the second cavity 320B based on the pressurized gas flow 306 passing from the plenum 304 through the second vent hole 312B into the first cavity 320A. The pressurized gas flow 306 is then released from the first and second cavities 320A, 320B to an environment 330 external to the component assembly 300.

Figure 11:
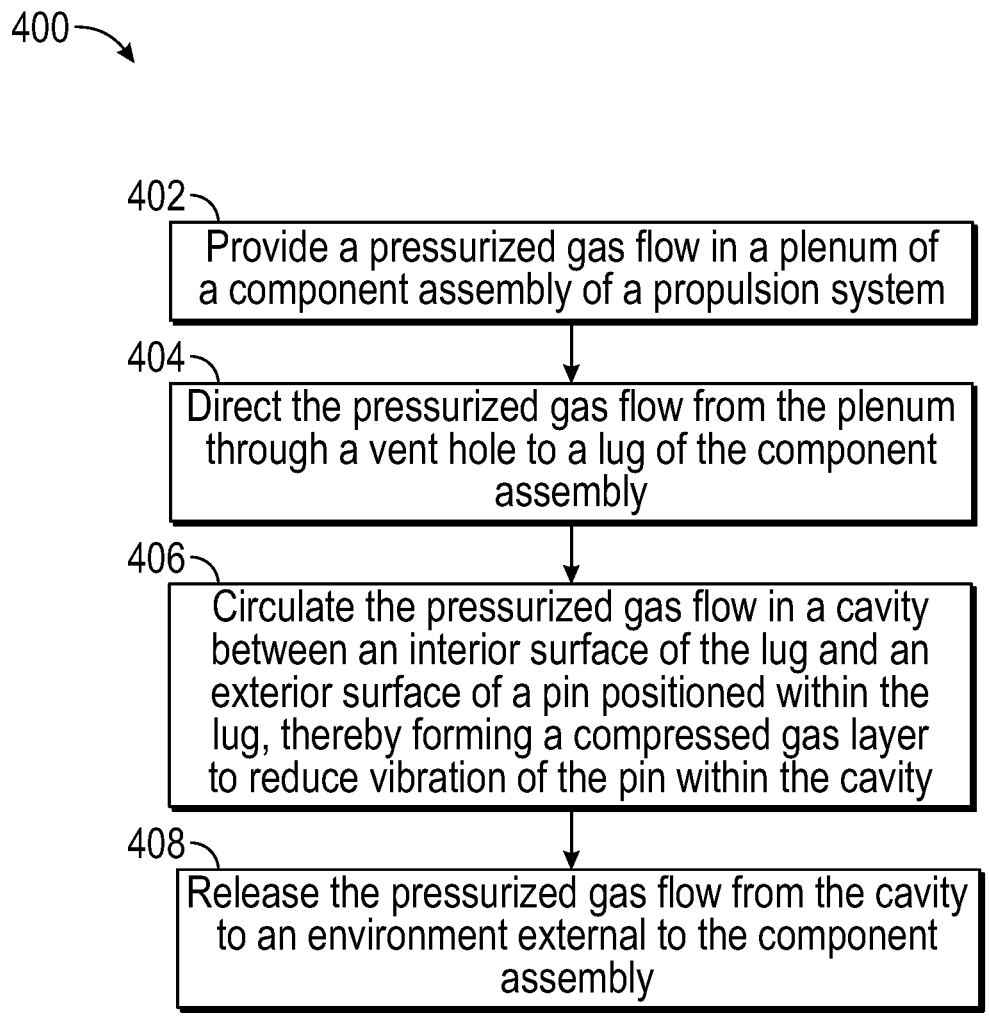
FIG. 11 is a flow chart illustrating a method, in accordance with an embodiment of the disclosure.

Referring now to FIG. 11 with continued reference to FIGS. 1-10, FIG. 11 is a flow chart illustrating a method 400 for providing pressurized gas damping in a propulsion system, in accordance with an embodiment. The method 400 may be performed, for example, by using the component assemblies 100, 200, 300 of FIG. 2-10 and/or other such component assemblies (not depicted).

Method 400 pertains to providing a gas damper and/or gas bearing in a component assembly 100, 200, 300 of a propulsion system 10, such as gas turbine engine 20 of FIG. 1. At block 402, a pressurized gas flow 106, 306 is provided in a plenum 104, 304 of a component assembly 100, 200, 300 of a propulsion system 10. The pressurized gas flow 106, 306 can be a cooling flow configured to provide cooling to an interior cavity 107, 307 of the component housing 102, 302.

At block 404, the pressurized gas flow 106, 306 is directed from the plenum 104, 304 through a vent hole 112, 312A, 312B to a lug 108, 308A, 308B of the component assembly 100, 200, 300. At block 406, the pressurized gas flow 106, 306 is circulated in a cavity 120, 320A, 320B between an interior surface 122, 322A, 322B of the lug 108, 308A, 308B and an exterior surface 124, 324 of a pin 118, 318 positioned within the lug 108, 308A, 308B, thereby forming a compressed gas layer 126, 326 to reduce vibration of the pin 118, 318 within the cavity 120, 320A, 320B. The pin 118, 318 can be a hinge pin of a secondary component of the propulsion system 10, where the secondary component may be configured to rotate relative to the component housing 102, 302, such as flap 301. At block 408, the pressurized gas flow 106, 306 can be released from the cavity 120, 320A, 320B to an environment 130, 330 external to the component assembly 100, 200, 300.

In embodiments, a journal cutout 202 can be formed within the interior 116 of the lug 108 and proximate to the vent hole 112. The journal cutout 202 can be configured to reduce premature expulsion of the pressurized gas flow 126 to the environment 130 external to the component assembly 200. In embodiments, damping a plurality of vibratory loads can be performed as the pin 118, 318 compresses the pressurized gas flow 106, 306 between the vent hole 112, 312A, 312B and the environment 130, 330 external to the component assembly 100, 200, 300, thereby reducing fretting wear of the component assembly 100, 200, 300. In some embodiments, the pressurized gas flow 306 can be split from the plenum 304 between the first vent hole 312A and a second vent hole 312B that forms a second gas path 314B between the plenum 304 and an interior 316B of a second lug 308B.

While the above description has described the flow process of FIG. 11 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component assembly of a propulsion system comprising:
    a component housing comprising a plenum configured to receive a pressurized gas flow of the propulsion system;
    a lug integrally formed with the component housing;
    a lug base region comprising a vent hole forming a gas path between the plenum and an interior of the lug; and
    a pin configured to be positioned within the interior of the lug, wherein a cavity is formed between an interior surface of the lug and an exterior surface of the pin as positioned within the lug, thereby forming a compressed gas layer to reduce vibration of the pin within the cavity based on the pressurized gas flow passing from the plenum through the vent hole into the cavity.

2. The component assembly of claim 1, further comprising a journal cutout within the interior of the lug and proximate to the vent hole, wherein the journal cutout is configured to reduce premature expulsion of the pressurized gas flow to an environment external to the component assembly.

3. The component assembly of claim 1, wherein the pin is a hinge pin of a secondary component of the propulsion system, and the secondary component is configured to rotate relative to the component housing.

4. The component assembly of claim 1, wherein damping of a plurality of vibratory loads is provided as the pin compresses the pressurized gas flow between the vent hole and an environment external to the component assembly, thereby reducing fretting wear of the component assembly.

5. The component assembly of claim 1, further comprising a second lug integrally formed with the component housing and a second lug base region comprising a second vent hole forming a second gas path between the plenum and an interior of the second lug, wherein the pressurized gas flow is split from the plenum between the vent hole and the second vent hole.

6. The component assembly of claim 5, wherein the pin is configured to be positioned within the lug and the second lug during operation of the propulsion system.

7. The component assembly of claim 1, wherein the pressurized gas flow is a cooling flow configured to provide cooling to an interior of the component housing.

8. A gas turbine engine comprising:
a fan section;
a compressor section;
a combustor section;
a turbine section;
a nozzle; and
a component assembly of the fan section, the compressor section, the combustor section, the turbine section, or the nozzle, the component assembly comprising:
  a component housing comprising a plenum configured to receive a pressurized gas flow of the gas turbine engine;
  a lug integrally formed with the component housing;
  a lug base region comprising a vent hole forming a gas path between the plenum and an interior of the lug; and
  a pin configured to be positioned within the interior of the lug, wherein a cavity is formed between an interior surface of the lug and an exterior surface of the pin as positioned within the lug, thereby forming a compressed gas layer to reduce vibration of the pin within the cavity based on the pressurized gas flow passing from the plenum through the vent hole into the cavity.

9. The gas turbine engine of claim 8, further comprising a journal cutout within the interior of the lug and proximate to the vent hole, wherein the journal cutout is configured to reduce premature expulsion of the pressurized gas flow to an environment external to the component assembly.

10. The gas turbine engine of claim 8, wherein the pin is a hinge pin of a secondary component of the gas turbine engine, and the secondary component is configured to rotate relative to the component housing.

11. The gas turbine engine of claim 8, wherein damping of a plurality of vibratory loads is provided as the pin compresses the pressurized gas flow between the vent hole and an environment external to the component assembly, thereby reducing fretting wear of the component assembly.

12. The gas turbine engine of claim 8, further comprising a second lug integrally formed with the component housing and a second lug base region comprising a second vent hole forming a second gas path between the plenum and an interior of the second lug, wherein the pressurized gas flow is split from the plenum between the vent hole and the second vent hole.

13. The gas turbine engine of claim 12, wherein the pin is configured to be positioned within the lug and the second lug during operation of the gas turbine engine.

14. The gas turbine engine of claim 8, wherein the pressurized gas flow is a cooling flow configured to provide cooling to an interior of the component housing.

15. A method comprising:
providing a pressurized gas flow in a plenum of a component assembly of a propulsion system;
directing the pressurized gas flow from the plenum through a vent hole to a lug of the component assembly;
circulating the pressurized gas flow in a cavity between an interior surface of the lug and an exterior surface of a pin positioned within the lug, thereby forming a compressed gas layer to reduce vibration of the pin within the cavity; and
releasing the pressurized gas flow from the cavity to an environment external to the component assembly.

16. The method of claim 15, wherein a journal cutout within the interior of the lug and proximate to the vent hole is configured to reduce premature expulsion of the pressurized gas flow to the environment external to the component assembly.

17. The method of claim 15, wherein the pin is a hinge pin of a secondary component of the propulsion system, and the secondary component is configured to rotate relative to a component housing.

18. The method of claim 15, further comprising damping a plurality of vibratory loads as the pin compresses the pressurized gas flow between the vent hole and the environment external to the component assembly, thereby reducing fretting wear of the component assembly.

19. The method of claim 15, further comprising:
splitting the pressurized gas flow from the plenum between the vent hole and a second vent hole that forms a second gas path between the plenum and an interior of a second lug.

20. The method of claim 15, wherein the pressurized gas flow is a cooling flow configured to provide cooling to an interior of a component housing.

* * * * *